C. Olds,
Corn Planters,
No. 55.
Additional Patent July 16, 1842
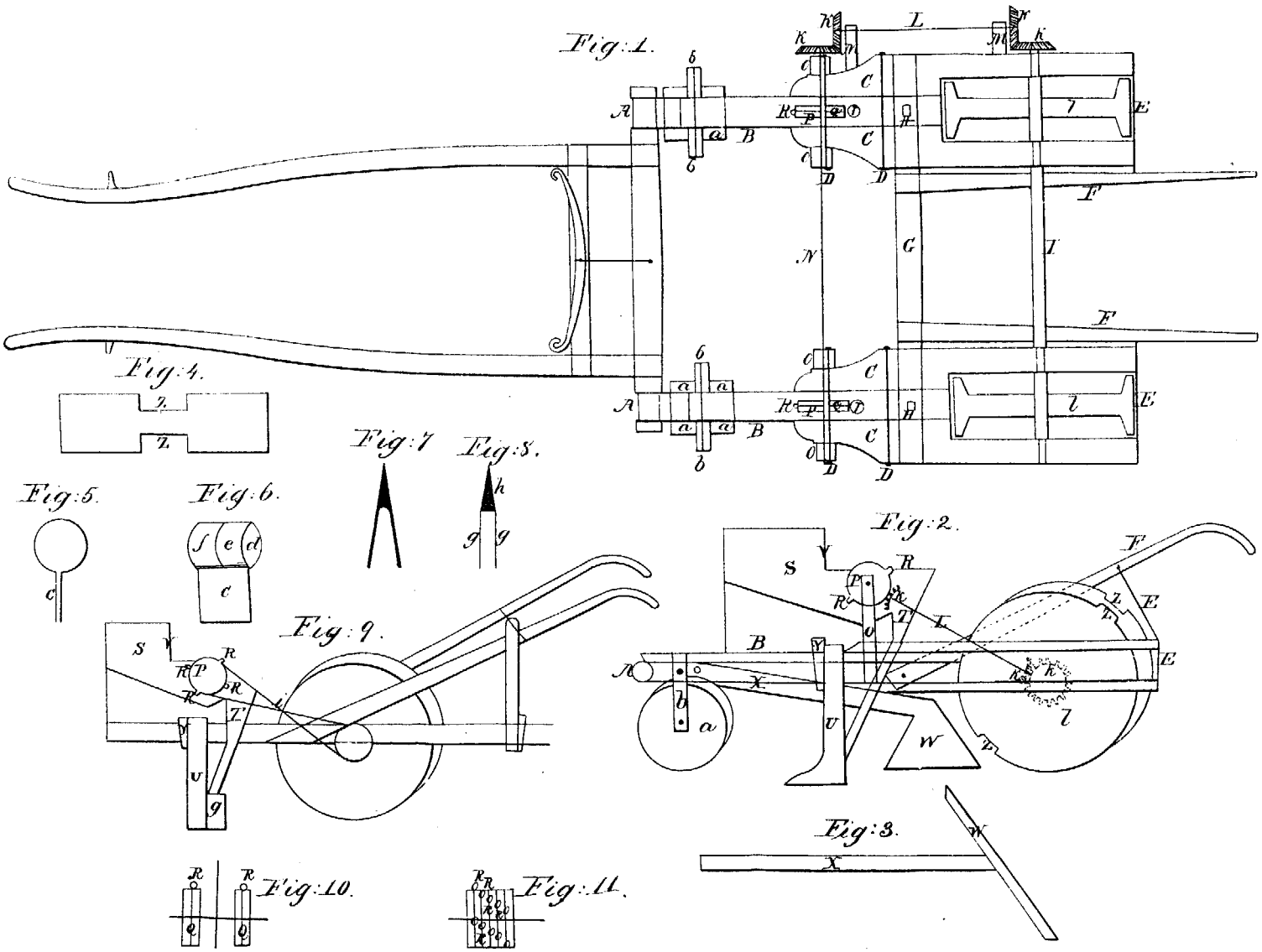
N. PETERS, PHOTO-LITHOGRAPHER, WASHINGTON, D. C.

UNITED STATES PATENT OFFICE.

CALVIN OLDS, OF MARLBOROUGH, VERMONT.

IMPROVEMENT IN MACHINES FOR PLANTING AND MANURING CORN.

Specification forming part of Letters Patent No. 1,933, dated January 20, 1841; Additional Improvement No. 55, dated July 16, 1842.

*To all whom it may concern:*

Be it known that I, CALVIN OLDS, of Marlborough, in the county of Windham and State of Vermont, have invented a new and useful Improvement on the Machine known by the name of "Olds' Corn-Planter and Seed-Sower," invented by myself, (for which Letters Patent were granted bearing date January 20, 1841;) and I do hereby declare that the following is a full, clear, and exact description of the construction and operation of the same, reference being had to the annexed drawings, making a part of this specification, in which—

Figure 1 is a perpendicular or bird's-eye view of the double corn-planter to make rows both ways. Fig. 2 is a side view of the right-hand side of the same. Fig. 3 is a perpendicular view of the scraper or coverer. Fig. 4 is a view of a segment of the main or marking wheel as it rolls upon the ground, or rather of the track that it leaves, the blank sides denoting the hill. Fig. 5 is a front view of the cup. Fig. 6 is a side or perspective view of the cup. Fig. 7 is a perpendicular view of the bottom of a cast-iron drill for a hand-power machine. Fig. 8 is a perpendicular view of the bottom of a cast and sheet iron drill for a hand-power machine, and the same that is represented in Fig. 9. Fig. 9 is a perspective view of a hand-power machine. Fig. 10 is a straightforward view of two dropping-wheels to drop two sorts of seed at the same operation, and likewise to drop manure in the hill with the seed.

Similar letters refer to similar parts.

The double corn-planter, as represented in Figs. 1 and 2, consists of a square frame standing upon four wheels carrying in front a pair of shafts which are connected to a roll similar to a one-horse sled. The roll is connected with the fore part of the machine by broad bands A passing around the necks of the roll and screwed fast to the main beams of the machine. The main beam B is a straight piece of timber about three and one-half feet long, two and one-half inches wide by three and one-half inches deep. The side pieces, C, which support the hind wheels, are made of two-inch plank bolted onto the main beam B by screw-bolts D passing through them, and cut out so as to admit the hind wheels to pass freely between them. An iron rod, E, passes across the sides C behind the wheels, and serves as a scraper to clean the wheels, and then up to the handles F to support them. A cross-bar, G, passes across the two sides of the machine before the hind wheels, and by the bolts H passing through it and the main beams B are made fast upon them. This, with the roll in front, connects the two sides of the machine firmly together. An iron shaft, I, one-inch diameter, with bearings or journals turned upon it corresponding to the frame of the machine for it to turn upon, passes through and between the hind wheels, J, upon which they are firmly fastened, so that both of them shall always roll together without variation. Upon the right-hand end of this shaft is fixed a small miter cog-wheel, which meshes with another that is fixed upon a small shaft, L, running in a line with the machine and supported by bearings M. Upon the forward end of this shaft is another cog-wheel of the same description meshing with the fourth, that is fixed upon the end of another small shaft, N, that extends across the machine supported by standing posts O, that are fastened upon each side of the two sides of the machine. Upon this last-mentioned shaft, N, about four or five inches above and directly over the sides of the machine, are placed on each end a small wheel, P, called the "dropping-wheels." These are about four inches diameter and one and one-half inch thick. Their peripheries are turned a little hollowing to prevent the seed from falling off as it passes over them. These wheels are each of them made of two wheels screwed together and making one wheel, as represented by the line Q in Figs. 1 and 10. Between these wheels, or rather in the joint of them, is placed the flange of the cup R. (Represented in Figs. 5 and 6 and seen in Figs. 1, 2, 9, and 10.) These wheels are fastened to the shaft by screws pressing against it from their periphery. When the machine moves forward these wheels roll over backward, and the cups upon them pass through the seed deposited under them in the boxes or hoppers S, dip it up and empty it into the tunnel or spout T, which conveys it to the open part of the hind end of the plow or drill U, as seen in Figs. 2, 7, 8, and 9. In the boxes or hoppers are slides or gates V, on the sides next the dropping-wheels, which regulate the depth of seed under them. The plows for the double corn-planter are like a common plow, or rather like a plowshare without a mold-board, and both turning toward each other.

Behind the plow follows a scraper or coverer, W, which consists of a board twelve or fourteen inches long and about six inches wide, standing edgewise up and down, and with an angle of about forty-five degrees, as represented in Figs. 2 and 3, the bottom edge level with the ground and across the furrow thrown out by the plow, and by its movement forward throws back the furrow and covers the corn. This scraper is supported by and is connected to the fore part of the machine by an arm, X, and may be made stationary or left to play up and down, as best suits the operator. The plow or drill may be raised or lowered by loosening the key Y, which fastens it in its place, as seen in Figs. 2 and 9, thereby regulating the depth of the seed at pleasure.

The hind or marking wheels, J, are about twenty-six inches diameter, or the circumference twice the distance the hills are apart. The periphery of these wheels is about eight inches wide. Upon the opposite sides of the wheels, and upon each side of the periphery, are places cut out, Z, as seen in Figs. 2 and 4. These places are about two and one-half inches wide by six inches long, being in a straight line across both wheels. This is to show where the corn is dropped. This marking may be done by reversing the periphery of the wheel and making the main part narrow—say about two inches—and the marking-place wide, so that it will make a stamp on the hill six or eight inches square, which is probably the best plan. This marking differs from Mr. David S. Rockwell's very much, and may be considered as an improvement from his, and my own. His wheels are about five inches wide, and the marking is done by a cleat or strip crossing its periphery, which is exactly like my first plan; but it did not answer the purpose, on account of the earth sticking to the wheels and covering the marker. As it projected out from the periphery of the wheel, it could not be kept clean. In my improvement the periphery of the wheel is smooth, and by the scraper can be kept clean, the marking being upon the sides of the wheel instead of being upon the periphery, making the track wider or narrower where the corn is dropped, either of which is distinctly seen. Mine differs also from Mr. Justus Rider's, as his marker is upon only one side of the wheel and mine is upon both sides, thereby making the marks more distinct and upon the center of the hill. The forward wheels, A, are ten or twelve inches in diameter and three or four inches wide, and run under the main beam B, supported by and running between two hanging posts, *b*. These run independent of each other, and serve only to support and carry the forward part of the machine. The cups are made of tin-plate bent over a round pin the size that is wanted, with the ends pressed together, as seen in Fig. 5, and making a flange, *c*, by which it is fastened to the dropping-wheel, as before described. A plug of cork or other substance is fitted into this cup, making the bottom, and by moving this plug nearer to or farther from the front end of the cup its capacity is increased or diminished at pleasure.

Fig. 6 is a perspective view of the cup with the cork in it. *d* is the mouth of the cup. *e* is the open part to take up the seed, and *f* is the cork or plug that makes the bottom.

The drills represented by Figs. 7 and 8 are intended to cut very narrow furrows, so as not to need any other coverer except the wheel passing over it. The flanges *g* in Fig. 8 are sheet-iron, riveted through the front part, *h*, and extend back to receive the spout or tunnel and prevent the earth falling into the furrow before the seed strikes the bottom. This cuts a furrow but about three-fourths of an inch wide.

In all machines, except for planting corn in rows both ways, the gearing may be dispensed with, and a cross band or belt, *i*, as seen in Fig. 9, may be used in its stead, with the addition of pulleys to increase or diminish the speed, (which every experienced mechanic understands,) by which means the distance between the hills may be varied at pleasure without adding or diminishing the number of cups. By placing two dropping-wheels upon the same shaft near together, and making a partition in the boxes between them, as seen in Fig. 10, two sorts of seed may be dropped in the same hills by placing the cups against each other and both dropping into the same spout or tunnel, and by varying the cups the hills may be made separate and in any position desired. In a similar manner the fine manures—such as poudrette, lime, plaster, ashes, &c.—may be dropped into the same hills with the seed. To drop manure a box should be cut into the dropping-wheel of sufficient capacity to take up a sufficient quantity for a hill, and drop at the same time with the seed into the same tunnel. This box should be made with a square shoulder in the rear part and the front part diminish by a true taper.

In the ordinary machine for dropping manure with seed it is sifted out of a separate box and is adapted only to the drilling system and will not drop it in the hill with the seed. A rod should be attached to the machine and extend out twice the distance from the center that the rows are apart. Hang a light chain to the end of it to make a mark for the horse to come back on.

Operation: For planting corn two rows at once and rows both ways, regulate the slide V in the hoppers so that the corn will not cover more than about one-third of the dropping-wheel. The quantity or corn for a hill is regulated by moving the cork in the cup. Next, by experiment, regulate the dropping so that the markers on the marking-wheel will track where the corn is dropped. This is done by hoisting the dropping-wheel shaft out of gear and turning it as the case may require; or the dropping-wheels may be loosened from the shaft and turned as the case may be, taking care that both drop at the same time. When this is done, commence planting by driving straight through the field with the chain dragging to mark for the horse to come back. When you get through, hoist the hind wheels off the ground and turn the machine about upon the forward wheels. Place the hind wheels so that the marks will correspond, and then proceed back, noticing frequently whether the marks correspond. If not, stop and turn the marking-wheels so that the marks will correspond, and so continue through your field and you will have rows both ways.

What I claim as my invention, and desire to secure by Letters Patent, consists in—

The plan of dropping corn or other seeds by cups with movable bottoms to increase or diminish the quantity of seed at pleasure and the improvement in marking the hills and arranging the dropping to correspond with the marks.

CALVIN OLDS.

Witnesses:
BENJ. B. OLDS,
CHARLES CLISBEE.